Figure 1:
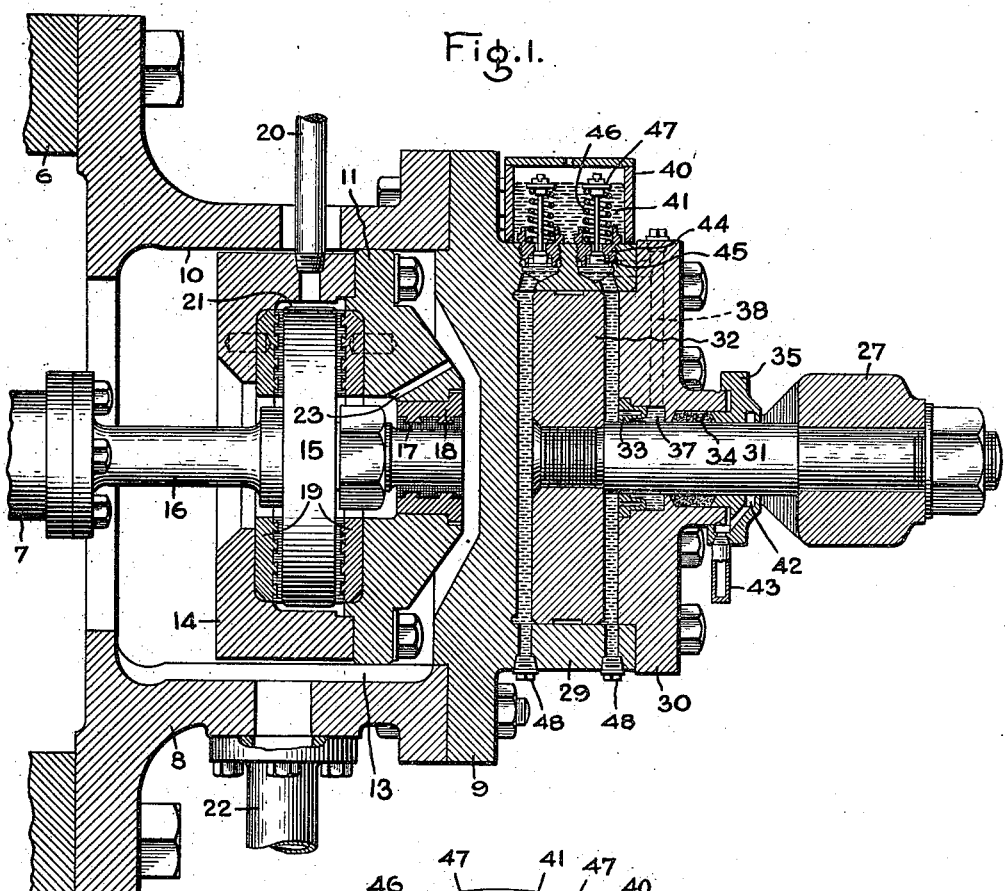

O. JUNGGREN.
VIBRATION DAMPER.
APPLICATION FILED JAN. 24, 1920.

1,421,785.

Patented July 4, 1922.

2 SHEETS—SHEET 1.

Inventor:
Oscar Junggren,
by Albert G. Davis
His Attorney.

O. JUNGGREN.
VIBRATION DAMPER.
APPLICATION FILED JAN. 24, 1920.

1,421,785.

Patented July 4, 1922.
2 SHEETS—SHEET 2.

Inventor:
Oscar Junggren,
by *Albert G. Davis*
His Attorney.

UNITED STATES PATENT OFFICE.

OSCAR JUNGGREN, OF SCHENECTADY, NEW YORK, ASSIGNOR TO GENERAL ELECTRIC COMPANY, A CORPORATION OF NEW YORK.

VIBRATION DAMPER.

1,421,785.  Specification of Letters Patent.  Patented July 4, 1922.

Application filed January 24, 1920. Serial No. 353,753.

*To all whom it may concern:*

Be it known that I, OSCAR JUNGGREN, a citizen of the United States, residing at Schenectady, county of Schenectady, State of New York, have invented certain new and useful Improvements in Vibration Dampers, of which the following is a specification.

The present invention relates to vibration dampers and is especially intended for use in connection with elastic-fluid turbines, the rotors of which may change their axial positions within the casing. Such changes may be due to normal or to abnormal conditions. The invention has for its object to improve the construction of such vibration dampers.

In such a device the problems involved are many and are difficult of solution. My improved apparatus is intended especially for use in turbines of the Ljungstrom type in which two blade elements or rotors are employed which rotate in opposite directions, the steam being admitted between the blade carrying structures and flowing radially outward. Because of this arrangement of steam passage, an outward thrust is created on both rotors which is compensated for by suitable thrust disks and packings. It is desirable to permit the rotors to slightly shift their axial positions with load changes but it is necessary that the shifting movements shall be rather slow since otherwise violent and sometimes destructive axial vibrations will be set up. The fact that the rotors revolve at high speed, i. e., from 1500 RPM on large sizes to 3600 on smaller sizes increases the difficulties and means that the lubrication of the rotating parts of the vibration damper must be very carefully maintained, especially since the thrust at these speeds is often very heavy.

One of the serious problems in such a damper where a fluid is employed as the damping medium, is to keep air out of the fluid because of its elasticity. If any appreciable amount is present it will seriously interfere with the damping action, and when once the axial vibrations of a turbine start they build up rapidly and are difficult to stop.

I have found by actual experience that mercury as a damping fluid possesses peculiar advantages. In the first place, on account of its relatively great weight compared to other fluids, there is practically no air present and if by any chance air does get into the system it is promptly eliminated even if there be only a small head. It will easily follow relatively slow movements of the dashpot piston but will offer great resistance to sudden movements. Further, on account of its nature it is comparatively easy to pack against leakage and does not creep along surfaces by capillary attraction.

Since it is necessary to lubricate the thrust bearing, I divide the apparatus into two principal parts, one containing the thrust bearing through which a plentiful supply of lubricating oil flows at all times, and the other the dashpot with means for maintaining its supply of mercury. Preferably but not necessarily the parts are arranged one beyond the other in the same axial plane since this arrangement permits an easy separation of the oil and mercury. Other arrangements of parts may be employed to meet special conditions.

For a consideration of what I believe to be novel and my invention, attention is directed to the accompanying description and claims appended thereto.

Figure 2:
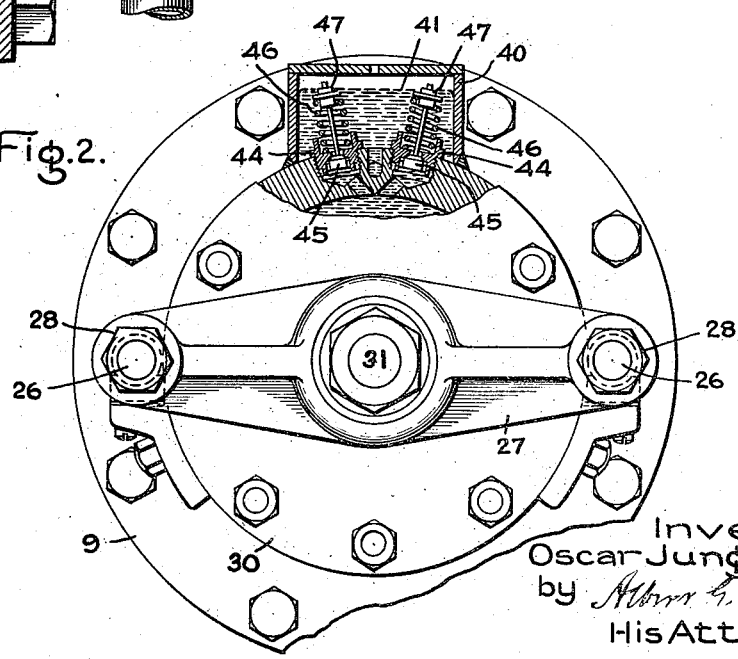
Figure 3:
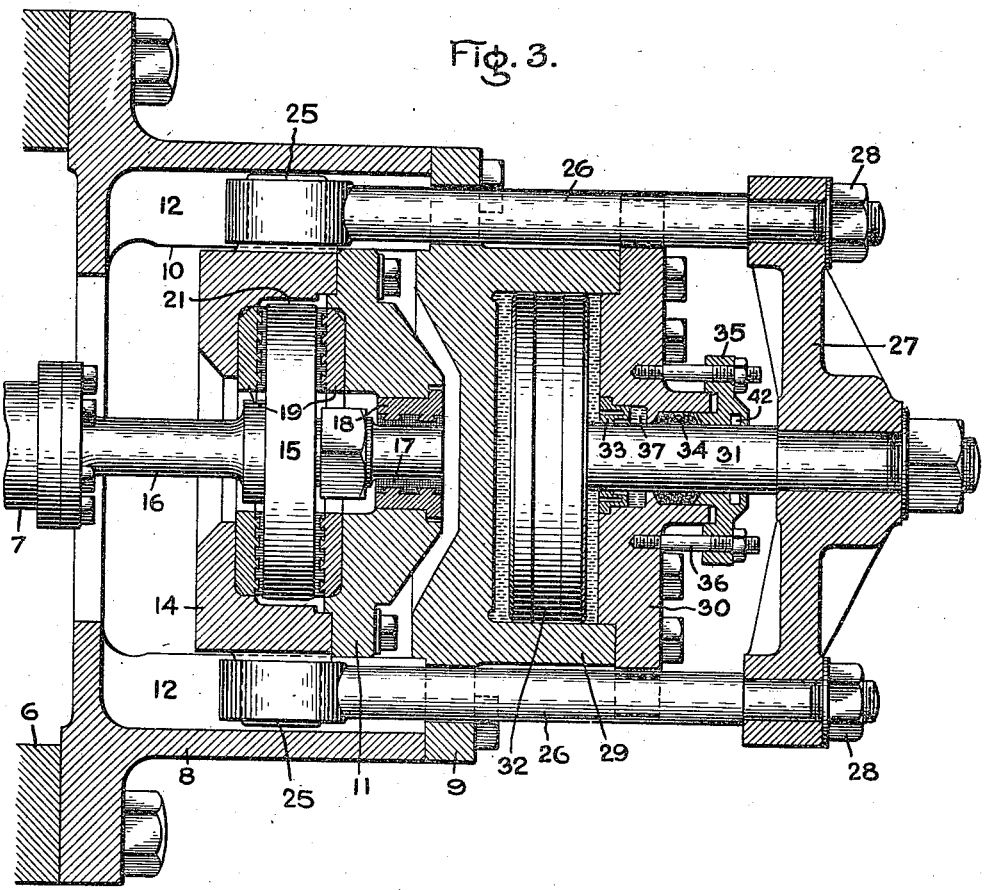
Figure 4:
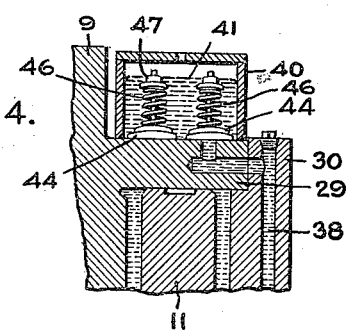

In the accompanying drawings which illustrate one of the embodiments of my invention, Fig. 1 is a vertical, axial section of a vibration damper; Fig. 2 is an end view of the same: Fig. 3 is a horizontal, axial section, and Fig. 4 is a detail view showing the mercury reservoir and passage leading thereto.

Referring to the drawing, 6 indicates a part which is secured to the turbine casing or associated part and 7 the turbine shaft or an extension thereof. In a Ljungstrom turbine, to which my invention is particularly adapted, the vibration damper is located at the end of the generator shaft, said generator shaft forming a continuation of the turbine shaft. In such a machine there are two rotors which revolve in opposite directions and each rotor is provided with a vibration damper, but as they are both alike only one is illustrated. 8 indicates a housing which is bolted to the part 6. The outer end of the housing is covered by a shouldered head 9 which is attached to the housing by bolts. This head serves as a means to separate the oil lubricating system from the mercury dashpot system and also forms a part of both systems as will appear later. The inside of the housing is bored to form a cylinder 10 in which is located a piston 11 forming a part of a thrust bearing casing, said piston being arranged to move axially within the cylinder to a limited extent. The continuity of the cylinder wall is interrupted at two points to form recesses 12, Fig. 3, in which the casing trunnions move as will appear later. A recess 13 is also formed in the wall to collect lubricating oil. Attached to the piston by bolts is a ring 14 forming the other part of the casing, the two parts being shouldered together to hold them in concentric relation and relieve the bolts of shearing strains. Located within the casing formed by piston 11 and ring 14 is a round, hardened steel thrust disk 15 which is carried by the auxiliary shaft 16, the latter having a flange on its inner end which is bolted to the corresponding flange on the shaft 7. The outer end of the shaft 16 is located in a babbitt-lined bearing 17 carried by a sleeve 18 which is seated in the piston part of the thrust casing. Located on opposite sides of the thrust disk are bearing disks 19 which are faced with babbitt. In the faces of the babbitt linings are oil grooves of usual construction. Lubricating oil is supplied to the thrust bearings by the pipe 20 which is tapped into the ring 14, there being a slot in the housing to permit the pipe to move axially with the thrust casing. Oil from the pipe enters the annular chamber 21 which surrounds the thrust disk and flows inwardly toward the axis of the shaft. The oil which lubricates the inner or left-hand side of the thrust disk flows freely through the enlarged opening around the shaft 16 into the cylinder and thence into the groove 13 which is in communication with the discharge pipe 22. The oil which flows through the right-hand side of the thrust bearing escapes by the passage 23 formed in the piston into the cylinder 10 and thence into the recess 13 and the discharge pipe 22. By arranging the passage 23 above the shaft and its bearing 17, a supply of lubricant to the latter is always insured. On opposite sides of the thrust casing are trunnions 25, Fig. 3, said trunnions being formed integral with the ring 14. These trunnions travel in the recesses 12 and are connected by connecting rods 26 with a yoke 27, the rods being secured to the yoke by nuts 28. The rods are guided toward their outer ends by guiding surfaces formed on the outer head of the dashpot piston, the purpose being to relieve the downward pressure on the stuffing box packing. By placing shims between the rods and guiding surfaces the proper alignment of parts can be obtained.

Formed on the outer face of the head 9 is the cylinder 29 of the mercury dashpot. Secured to the outer end of the cylinder by bolts is a head 30 through which extends the rod 31 of the piston 32. In the head are two packings; the inner packing 33 is of the cup type and is made of metal and is seated on a shoulder of the head. The inner part of the packing engages the rod 31. The purpose of making this packing cup-shaped or U-shaped in cross section is to insure the inner part of the packing hugging the shaft when the piston 32 moves outwardly or to the right, thereby increasing the fluid pressure in the cylinder on that side of the piston. The second packing is of the ordinary stuffing-box type and comprises a body of packing material 34 and a gland 35 which can be adjusted by the bolts 36. Between the packings is a chamber 37 which is always in free communication with the vertically extending passage 38, shown in dotted lines in Fig. 1 and full lines in Fig. 4, and leading to the reservoir in the head 30.

Situated above the dashpot cylinder is a reservoir 40 which is nearly filled with mercury 41, the arrangement being such that the mercury is supplied to the cylinder by gravity. The reservoir may have a direct opening to atmosphere through a small orifice or the cover may be loose enough so that air may seep in under its edges. The vertical passage 38 previously referred to communicates with this reservoir through smaller passages as best shown in Fig. 4. Since the chamber 37, passage 38 and the reservoir are exposed to atmospheric pressure any mercury which is forced out of the cylinder and past the packing 33 will enter said chamber 37 and flow upward to the mercury reservoir because the resistance to flow will be very much less than through the packing gland. If, on the other hand, when the piston 32 moves inwardly or to the left and the packing 33 should leak, mercury will flow in the opposite direction into the cylinder space. Thus it will be seen that the admission of air to the dashpot is effectively prevented. If any mercury should succeed in working past the stuffing-box, means are provided for catching it. Said means are formed as a part of the stuffing-box gland 35. To this end the gland is provided with an annular chamber 42 which communicates with a small passage leading into the receptacle or container 43 which is screw-threaded to the gland.

Since a device of this kind depends for effective action on maintaining the cylinder spaces on opposite sides of the piston filled with mercury, valve means are provided for admitting mercury to the cylinder spaces as the piston moves. As the piston moves within the cylinder a slow transfer of mercury takes place from one side of the piston to the other through the clearance between the piston and its cylinder. In the present illustration two valves are provided for each side of the piston, said valves being alike in construction. The cylinder wall is bored and tapped to receive a screw-threaded member or bushing 44 which contains a seat for the inwardly opening valve 45. Surrounding the stem of the valve is a coiled compression spring 46 which is seated at its lower end on the bushing 44 and engages a disk 47 secured to the upper end of the stem.

It will be noted that the oil and mercury systems will coöperate to restrict axial movements of the shaft 7 and are maintained entirely separate which is a very advantageous arrangement especially where mercury is employed, since it is very difficult, if not impossible, to separate oil and mercury without subjecting the same to heat to boil off the oil.

I have shown the thrust bearing and the mercury dashpot in separate vertical planes, since this arrangement simplifies the problem of separating the two fluids. Other arrangements may be employed, however, if desired. The arrangement shown is simple in construction and one which may be readily assembled and taken down for the purpose of inspection and repairs. In order to remove the mercury which is, of course, relatively expensive, drain plugs 48 are provided whereby the cylinder space may be drained and also the reservoir above by removing the cover and depressing one or more of the valves by hand. The mercury which is contained in the chamber 37 and passage 38 may be saved after the head 9 is removed by inverting the cylinder and letting the mercury run into a suitable receptacle. If it be desired to inspect the thrust bearing without disturbing the mercury dashpot, the nuts securing head 9 in place are removed and also the nuts 28 when the mercury end of the apparatus may be removed as a unit. By taking out the bolts which clamp the piston 11 of the thrust casing to the ring 14, the surfaces of the thrust bearing may be observed.

Slight axial movements of the shaft 7 can take place slowly to meet different load conditions in the turbine, but if the axial motions tend to take place suddenly the action of the mercury in the dashpot cylinder is so sluggish as to render the movements comparatively slow and thereby prevent vibrations which would be set up if the rotor and shaft 7 were unrestrained.

Assuming that the thrust disk 15 is rotating in the usual way and the shaft 7 tends to move outwardly, the thrust disk exerts an outward pressure on the thrust casing. This pressure is in turn transmitted through the connecting rods 26 to the yoke 27 and piston rod 31 to the piston 32. If the motion is slow the mercury will slowly leak through the small piston clearance, but on the other hand if the thrust is sudden, the mercury in the cylinder space on the outside of the dashpot piston will retard its motion. In other words, the dashpot is intended to check quick motions but does not seriously interfere with slow motions.

In a construction of this kind, it is very difficult to make a part such as the thrust disk 15 run absolutely true. This is compensated for by making the face of the piston 11 relatively narrow and connecting the thrust casing by trunnions and connecting rods with the yoke. There is sufficient yield in these parts to compensate for any reasonable lack of accuracy in the rotating thrust disk 15.

The specific construction of the packing arrangement for the rod of the dashpot piston is not claimed herein as it forms the subject matter of a separate application.

In accordance with the provisions of the patent statutes, I have described the principle of operation of my invention, together with the apparatus which I now consider to represent the best embodiment thereof; but I desire to have it understood that the invention may be carried out by other means.

What I claim as new and desire to secure by Letters Patent of the United States, is:

1. The combination with a rotor which is subject to axial vibrations, of thrust absorbing means connected to the rotor, said thrust absorbing means being capable of axial movement, a dashpot, and means connecting the movable member of the dashpot to the thrust absorbing means.

2. The combination with a rotor which is subject to axial vibrations, of thrust absorbing means connected to the rotor, said thrust absorbing means being capable of axial movement, a mercury containing dashpot, and means connecting the movable member of the dashpot to the thrust absorbing means.

3. The combination with a rotor which is subject to axial vibrations, of thrust absorbing means connected to the rotor, said thrust absorbing means being capable of axial movement, a dashpot, means connecting the movable member of the dashpot to the thrust absorbing means, means for supplying lubricant to the thrust absorbing means, and means for maintaining the cylinder of the dashopt filled with a different fluid.

4. The combination with a rotor subject to axial vibrations of a thrust member, a thrust absorbing member, one of said members being connected to and rotating with the rotor, the other being non-rotatable and capable of axial movements, a piston and cylinder, one of said parts being connected to the axially movable thrust member, and means for supplying different fluids to the thrust members and cylinder.

5. A vibration damper for rotors subject to axial vibrations comprising cylinder and piston members and means for supplying liquid thereto, characterized by the fact that means separate from the cylinder and piston members is provided for taking the axial thrust of the rotor.

6. The combination with a rotor subject to axial vibrations, of a thrust member, a thrust absorbing member, one of said members being connected to and rotating with the rotor, the other being non-rotatable and capable of axial movements, a piston and cylinder, one of said parts being connected to the axially movable thrust member, means for supplying lubricating fluid to said members, and a separate source of fluid supply which fluid is heavier than the lubricating fluid for filling the cylinder on opposite sides of the piston.

7. The combination with a rotor subject to axial vibrations, of thrust members cooperating with the rotor, one member rotating therewith, the other absorbing its thrust, a housing in which the thrust absorbing member is located, said member being held against rotation but free to slide, a piston and cylinder, the latter being supported on the housing, means connecting the thrust absorbing member and the piston, and means for maintaining a supply of fluid in the cylinder on opposite sides of the piston.

8. The combination with a rotor subject to axial vibrations, of a disk driven by the rotor, a casing in which the disk revolves, a housing in which the casing can slide axially, a piston and cylinder, means for supporting the cylinder and separating it from the interior of the housing, and means connecting the sliding casing with the piston.

9. The combination with a rotor subject to axial vibrations, of a disk driven by the rotor and located at the outer end of its shaft, a casing which encloses the disk and takes its thrust, a support for the casing, a piston and cylinder, said cylinder being mounted on the support, a rod for the piston which extends outwardly therefrom, and a means extending from the outer portion of the piston rod to the casing for transmitting thrusts on the latter to the piston.

10. The combination with a rotor subject to axial vibrations, of a disk driven by the rotor and located at the outer end of its shaft, a casing which encloses the disk and takes its thrust, a housing in which the casing is guided, a piston and cylinder, a head for the housing which supports the cylinder and forms a separating wall between the interior of the housing and the cylinder, means supplying lubricant to the thrust disk, means supplying fluid to the cylinder spaces on opposite sides of the piston, valve means for controlling the flow of fluid to the cylinder spaces, a rod for the piston, and a connection between the rod and the casing through which movements of the latter are communicated to the piston.

11. The combination with a rotor shaft subject to axial vibrations, of a thrust absorbing means connected to the rotor, a dashpot comprising a piston and cylinder, the movable part of which is connected to the thrust means, a reservoir open to atmosphere for supplying fluid by gravity to the cylinder of the dashpot, valve means between the reservoir and cylinder which open freely toward the cylinder, a rod for the movable part of the dashpot, and a packing for the rod.

12. The combination with a rotor shaft subject to axial vibrations, of a thrust absorbing means connected to the rotor, a dashpot comprising a piston and cylinder, the movable part of which is connected to the thrust means, a reservoir for supplying fluid to the cylinder of the dashpot, valve means between the reservoir and cylinder which open freely toward the cylinder, a rod for the movable part of the dashpot, and a packing for the rod which decreases the clearance around the rod under an increase of cylinder pressure.

13. The combination with a rotor shaft subject to axial vibrations, of a thrust absorbing means connected to the rotor, a dashpot comprising a piston and cylinder, the movable part of which is connected to the thrust means, a reservoir mounted above the cylinder which contains mercury and is open to atmosphere, inwardly opening valve means on opposite sides of the piston which control the passage of mercury from the reservoir to the cylinder spaces, and a packing means for the piston rod.

14. The combination with a rotor shaft subject to axial vibrations, of a thrust absorbing means connected to the rotor, a dashpot comprising a piston and cylinder, the movable part of which is connected to a part of the thrust means, a reservoir located above the cylinder for supplying fluid thereto, inwardly opening valves for regulating the supply of fluid to the cylinder on opposite sides of the piston, and springs for normally holding the valves on their seats.

15. The combination with a rotor subject to axial vibrations, of a thrust absorbing means associated therewith, a dashpot, the movable part of which is connected to a part of the thrust means, means for continuously supplying lubricant to the thrust means, and means for maintaining the cylinder of the dashpot full of mercury, the supplies of lubricant and mercury being separately maintained.

16. The combination with a rotor subject to axial vibrations, of a thrust absorbing means comprising a disk rotated by the rotor, bearings engaging opposite sides of the disk, a casing containing the bearings, a housing in which the casing is located, a dashpot comprising a piston and cylinder mounted on the housing, a rod for the piston, a yoke on the piston, trunnions on the thrust casing, and connecting rods which unite the trunnions and yoke.

17. The combination with a rotor subject to axial vibrations, of a thrust absorbing means comprising a disk rotated by the rotor, bearings engaging opposite sides of the disk, a casing containing the bearings, which latter comprises a piston member, a ring and uniting means, a stationary housing which has a cylindrical bore for guiding the piston member and has lubricant receiving means, a lubricant supplying means, a discharge conduit communicating with said receiving means, a conduit for supplying lubricant to the disk and bearings, a cylinder mounted on the housing which is sealed against the admission of lubricant, a piston in the cylinder, a rod for the piston, a yoke and rods for connecting the piston and thrust casing, and means for maintaining the cylinder spaces on opposite sides of the piston filled with fluid.

18. The combination with a rotor subject to axial vibrations, of a thrust disk driven by the rotor, a casing comprising a pair of members which enclose the disk to absorb its thrust, one of said members also acting as a guiding means and containing a bearing for the shaft of the disk, the other member comprising a ring, means for uniting the members, means for lubricating the disk, a housing for the casing, a head for the housing which seals one end thereof, a cylinder mounted on the head, a piston in the cylinder, an outer head therefor, a rod for the piston which passes through the outer head, packing means for the rod, means for keeping the cylinder filled with fluid, and means for connecting the casing with the rod.

19. The combination with a rotor subject to axial vibrations, of a thrust disk driven by the rotor, a casing which contains the disk and absorbs its thrust, a dashpot comprising a piston and cylinder, and means which connects the casing and the piston which yield slightly to compensate for lack of accuracy in the running of the disk.

In witness whereof, I have hereunto set my hand this 22nd day of January, 1920.

OSCAR JUNGGREN.